United States Patent Office 3,444,258
Patented May 13, 1969

3,444,258
PRODUCTION OF 1,3,7-OCTATRIENE
Josef F. Kohnle, Alameda, and Lynn H. Slaugh, Lafayette, Calif., assignors to Shell Oil Company, New York, N.Y., a corporation of Delaware
No Drawing. Filed Sept. 20, 1967, Ser. No. 669,266
Int. Cl. C07c *3/60, 3/10*
U.S. Cl. 260—677                                5 Claims

ABSTRACT OF THE DISCLOSURE

The linear dimer 1,3,7-octatriene is produced as the major product and in preference over the cyclic dimer 4-vinylcyclohexene by dimerizing 1,3-butadiene in the presence of carbon dioxide and a catalytic amount of a complex of platinum or palladium and a tertiary phosphine containing at least one aryl moiety. 1,3,7-octatriene is useful for the production of epoxy compounds and for the production therefrom of resin products.

BACKGROUND OF THE INVENTION

In dimerizing butadiene to produce preferentially a linear unbranched hydrocarbon acyclic dimer, e.g., 1,3,7-octatriene, available methods require the addition to certain metal complex catalysts of liquid reagents such as phenols and alcohols or the formation of intermediates such as ethers which require degradation to produce the desired octatriene. J. Feldman, B. A. Saffer and O. D. Frampton, U.S. Patent 3,284,529, issued Nov. 8, 1966, disclose the production of octatrienes by dimerization of butadiene utilizing zero-valent nickel catalysts derived from nickel carbonyl in combination with phenol co-catalyst. H. Seibt and N. von Kutepow, U.S. Patent 3,277,099, issued Oct. 4, 1966, disclose a similar process wherein the cocatalyst is alcohol. E. J. Smutny, U.S. Patent 3,267,169, issued Aug. 16, 1966, discloses the production of octatrienes by the degradation of aromatic 2,7-octadienyl ether, obtained from the reaction of a phenol and butadiene, into a 1,3,7-octatriene and a phenol corresponding to the aromatic moiety of the ether reactant.

SUMMARY OF THE INVENTION

It has now been found that 1,3,7-octatriene is produced in major amount by dimerizing 1,3-butadiene in the presence of carbon dioxide and a catalytic amount of a complex of platinum or palladium and a tertiary phosphine containing at least one aryl moiety.

Description of preferred embodiments

In dimerizing 1,3-butadiene in accordance with the present invention, the linear dimer 1,3,7-octatriene is formed as the major product and in preference over the cyclic dimer 4-vinylcyclohexene. A requirement of the present invention is that the dimerization process be conducted in the presence of carbon dioxide. In the absence of carbon dioxide, even though the proper catalytic conditions hereinbelow described are present, the product mix is reversed, i.e., 4-vinylcyclohexene is formed in major amount and 1,3,7-octatriene, in minor amount. Hence, carbon dioxide is a critical requirement herein for the production of 1,3,7-octatriene in major amount. Although the exact role played by carbon dioxide is not known, the present invention can be carried out at initial partial pressures of carbon dioxide well below 1,000 p.s.i. to as low as about 1 atmosphere (15 p.s.i.) or less. The invention is, however, not limited in its applicability to the lower initial partial pressures of carbon dioxide, and initial partial pressures in the range from about atmospheric up to about 2,000 p.s.i. are useful. Even higher ones, such as up to about 5,000 p.s.i., may be employed. The specific initial partial pressure of carbon dioxide preferably used will be governed to some extent by the specific charge employed, as well as by equipment requirements. Total pressure may be substantially greater, for example, when inert gases such as nitrogen and the like are present in the carbon dioxide charged. In general, initial partial pressures of carbon dioxide in the range of from about 200 to about 1,200 p.s.i. and particularly in the range of from about 300 to about 1,000 p.s.i. are preferred. The benefit from the use of carbon dioxide is obtained even in the presence of additional prior art liquid reagents such as alcohols and phenols.

The catalyst composition employed in the process of the invention is platinum or palladium complexed with tertiary phosphine containing at least one aromatic moiety. Without wishing to be bound by any particular theory, it appears that the chemical transformations during the course of the reaction which involve the catalyst are quite complex; however, it is believed that the actual catalytic species may be a bis(tert-phosphine)-metal (zero-valent) complex associated with carbon dioxide. The process of the invention is characterized by the requirement that the metal component of the catalyst, i.e., platinum or palladium, and the tertiary phosphine component of the catalyst be present in the reaction zone in a specific molar relationship with respect to each other. This requirement is met when, for each mole of platinum or palladium present in the reaction zone, there is also present from about 3 to about 8 moles of tertiary phosphine. In one modification of the process, catalyst is introduced or produced in situ in the form of a tris(tert-phosphine)platinum, tetrakis(tert-phosphine)platinum, tris(tert-phosphine)palladium or a tetrakis(tert-phosphine)palladium compound, which compounds are prepared and described by L. Malatesta and M. Angoletta, J. Chem. Soc., 1957, 1186, and L. Malatesta and C. Cariello, J. Chem. Soc., 1958, 2323. These complexes contain 3 or 4 moles of tertiary phosphine per mole of metal. Optionally, additional phosphine of up to 5 or 4 moles may be added so that the total phosphine is within the prescribed range of about 3 to about 8 moles per mole of metal. These tetraccordinated and tricoordinated complexes of zero-valent platinum or palladium are known to dissociate (see also R. Ugo, F. Cariati and G. La Monica, Chem. Comm., 1966, 868) to produce in situ a dicoordinated complex, i.e., a bis(tert-phosphine)-metal (zero-valent) complex, which is believed to associate with carbon dioxide in the reaction zone, e.g., $Pt[P(C_6H_5)_3]_2(CO_2)_1$ or $_2$. However, the use of a bis(tert-phosphine)-metal (zero-valent) complex without the required additional tertiary phosphine does not produce the desired product mix, probably owing to its further dissociation. In an alternate modification of the process of the invention, catalyst is introduced or produced in situ in the form of a bis(tert-phosphine)carobnatoplatinum complex or the corresponding palladium complex. Such complexes are prepared and described by C. J. Nyman, C. E. Wymore and G. Wilkinson, Chem. Comm., 1967, 407. Bis(tert-phosphine)carbonatoplatinum contains 2 moles of phosphine per mole of metal; hence, at least about 1 mole of phosphine must be added and optionally up to 6 moles of phosphine may be added in order that total phosphine concentration is within the prescribed range. The carbonato complexes, in which the metal has a valence of two, are reduced by a tertiary phosphine to produce a zero-valent metal complex; for example, bis(tert-phosphine)carbonatoplatinum in the presence of a tertiary phosphine yields tris(tert-phosphine)platinum and tert-phosphine oxide. The tricoordinated complex dissociates as mentioned hereinabove to dicoordinated complex which is believed to associate with carbon dioxide in the reaction zone.

The tertiary phosphines suitable for use in the process of the invention may be represented by the formula $R_3P$ wherein R independently is an organo group having from 1 to 20 carbon atoms, preferably 1 to 10, having only aromatic unsaturation and at least one R is always aromatic. R is therefore saturated aliphatic, including cycloaliphatic, or is aromatic in character, preferably mononuclear aromatic, and is hydrocarbyl, that is, contains only atoms of carbon and hydrogen, or is substituted hydrocarbyl containing, besides atoms of carbon and hydrogen, other atoms such as oxygen, sulfur, nitrogen and halogen, particularly halogen of atomic number from 9 to 35, which atoms are present in functional groups such as alkoxy, aryloxy, carboalkoxy, acyl, trihalomethyl, halo, cyano, dialkylamino, sulfonylalkyl, alkanoyloxy and like groups having no active hydrogen atoms. A preferred class of nonhydrocarbyl substituents comprises an atom having an atomic number from 7 to 8, i.e., nitrogen or oxygen, one valence of which is satisfied by bonding to an otherwise hydrocarbyl R substituent, and the remaining valence(s) are satisfied by bonding to lower alkyl radicals which are alkyl of from 1 to 4 carbon atoms. Such preferred nonhydrocarbyl substituents are alkoxy wherein the alkyl moiety is alkyl of from 1 to 4 carbon atoms and N,N-dialkylamino wherein each alkyl independently is alkyl of from 1 to 4 carbon atoms.

Illustrative of suitable saturated aliphatic R groups are hydrocarbyl R groups such as methyl, ethyl, propyl, isopropyl, butyl, isooctyl, decyl, lauryl, stearyl, cyclohexyl, cyclopentyl, 3,4-dimethylcyclopentyl, cyclooctyl, benzyl and β-phenylethyl; as well as substituted groups such as 4-bromohexyl, methoxymethyl, 3-(diethylamino)propyl, 4-carbethoxybutyl, and 2-acetoxyethyl. Aromatic R groups include hydrocarbyl aromatic groups such as phenyl, tolyl, xylyl, p-ethylphenyl, p-tert-butylphenyl, m-octylphenyl, 2,4-diethylphenyl, p-phenylphenyl, m-benzylphenyl and 2,4,6-trimethylphenyl; and substituted hydrocarbyl aromatic R groups including p-methoxyphenyl, m-chlorophenyl, m-trifluoromethylphenyl, p-propoxyphenyl, p-carbethoxyphenyl, 2,4-dichlorophenyl, 2-ethyl-5-bromophenyl, p-dimethylaminophenyl, m-diethylaminophenyl, 3,5-dibutoxyphenyl, p-acetoxyphenyl, 2-hexyl-3-methylsulfonylphenyl, 3,5-bis(trichloromethyl)phenyl and 3-dibutylaminophenyl.

In the $R_3P$ component as defined above, the R moieties are the same or different, with the proviso that at least one R is always aromatic. Exemplary R groups include phosphines such as triphenylphosphine, tris(4-methoxyphenyl)phosphine, tris(4-tolyl)phosphine, tris(3-chlorophenyl)phosphine, tris(4-dimethylaminophenyl)phosphine, hexyldiphenylphosphine, dimethyl(3-methoxyphenyl)phosphine, dibutylphenylphosphine, methyldiphenylphosphine, butyldiphenylphosphine, n-decyldiphenylphosphine and the like. In general, phosphine components wherein the phosphorus substituents are wholly aromatic are referred over those in which the substituents are a mixture of aromatic and aliphatic. Largely because of economic reasons, triphenylphosphine is a particularly preferred tertiary phosphine.

The process of the invention is characterized by the requirement for only catalytic quantities of platinum or palladium and the tertiary phosphine component. Although utilization of larger amounts of platinum- or palladium-containing catalyst is not detrimental to the process of the invention, amounts larger than about 5 mole percent based on total reactant, i.e., butadiene, are not generally required. Amounts of platinum or palladium less than about 0.001 mole percent on the same basis are generally unsuitable because of the inevitable physical losses of catalyst during reaction and processing. In most instances, amounts of catalyst from about 0.01 mole percent to about 0.5 mole percent based on butadiene are satisfactory and are preferred. The quantity of phosphine required is related to the amount of platinum or palladium utilized, as described hereinbefore.

The process of the invention is typically conducted by charging the butadiene, carbon dioxide and catalyst components to an autoclave or similar reactor and maintaining the reaction mixture at reaction temperature until reaction is complete. The method of mixing is not critical although it is generally preferred to mix the butadiene, the catalyst components and solvent, if any, and add the carbon dioxide thereto. The reaction is suitably conducted throughout a moderate range of reaction temperatures, so long as the butadiene is maintained substantially in the liquid phase. Reaction temperatures from about 50° to about 200° C. are satisfactory, although temperatures from about 100° to about 130° C. are preferred.

The process of the invention is conducted in the presence or absence of a solvent. In the modification wherein solvent is employed, solvents that are suitable are those capable of dissolving the reactant and catalyst components, and are inert to the reaction and the product prepared therefrom. Exemplary solvents are normally liquid ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; normally liquid aromatic hydrocarbons, such as benzene, toluene and xylene; and nitriles such as acetonitrile and benzonitrile. The solvent, if any, is employed in molar excess over the amount of reactant, and in general, moles of solvent up to about 150 moles per mole of reactant are satisfactory. It is generally preferred to conduct the reaction in the presence of added solvent in order to maintain the reaction mixture substantially in the liquid phase.

Subsequent to reaction, the reaction mixture is separated and the desired 1,3,7-octatriene product recovered by conventional means such as selective extraction, fractional distillation and chromatographic techniques.

The 1,3,7-octatriene product of the invention is useful in a variety of applications. This linear unsaturate is useful as a monomer in polymerization processes or is employed in copolymerization with other monomeric materials, e.g., ethylene and propylene, to form thermoplastic materials and elastomers. The 1,3,7-octatriene product may be treated with organic peracids for the conversion of the ethylenic linkages into epoxy groups. For example, 1,3,7-octatriene is reacted with peracetic acid to obtain the monoepoxides, the diepoxides and/or the triepoxide of 1,3,7-octatriene; 1,2-epoxy-3,7-octadiene, 3,4-epoxy-1,7-octadiene, 7,8-epoxy-1,3-octadiene, 1,2,3,4-diepoxy-7-octene, 1,2,7,8-diepoxy-3-octene, 1,2,5,6-diepoxy-7-octene and 1,2,3,4,7,8-triepoxyoctane are each useful for the production thereform of resin products. The unsaturated epoxides, e.g., 1,2-epoxy-3,7-octadiene or 1,2,3,4-diepoxy-7-octene, are first polymerized (polymerization of the ethylenic linkage) by heating with about 5% by weight of tert-butyl hydroperoxide or di(tert-butyl) peroxide and then cured (polymerization of the epoxide groups) by heating with an epoxy curing agent, e.g., about 15% by weight of phthalic anhydride. The triepoxide, 1,2,3,4,7,8-triepoxyoctane, is cured by mixing a curing agent, e.g., about 12% by weight of diethylenetriamine, with the triepoxide and heating. The ethylenic linkages of 1,3,7-octatriene also are hydrated or hydroxylated to form alcohols from which useful ethers, carboxylate esters, sulfates, sulfonates and the like are produced, or are halogenated to form halo derivatives useful, for example, as precursors for quaternary ammonium salts with germicidal properties. Additionally the ethylenic linkages are partially or completely hydrogenated to form other useful products.

EXAMPLE 1

A series of experiments was conducted in accordance with the following method. For each run, to a reactor were were charged 16 g. (0.296 mole) of butadiene, carbon dioxide to 400 p.s.i., 30 ml. (0.338 mole) of benzene as solvent, 0.5 g. (0.00065 mole) of bis(triphenylphosphine)-carbonatoplatinum and additional teritary phosphine as indicated in Table I below. The reaction mixture was maintained at 120° C. for about 17 hours and at the conclusion of this time the pressure was released and the product mixture was analyzed by gas-liquid chromatography (GLC). The results of this series, i.e., conversion based on butadiene charged with selectivities to products obtained, are shown in Table I.

TABLE I

| Run No. | Triphenylphosphine Added | | Total Moles of Phosphine per Mole of Platinum | Conversion, percent | Selectivity to— | |
|---|---|---|---|---|---|---|
| | Grams | Moles | | | 1,3,7-octatriene, percent | 4-vinylcyclohexene, percent |
| 1 | None | | 2 | 68 | 17 | 75 |
| 2* | None | | 2 | 15 | 9 | 71 |
| 3 | 0.1 | 0.00038 | 2.6 | 56 | 8 | 78 |
| 4 | 0.3 | 0.00110 | 3.7 | 45 | 70 | 30 |
| 5 | 0.5 | 0.00190 | 4.6 | 40 | 85 | 15 |
| 6 | 0.7 | 0.00270 | 5.8 | 48 | 93 | 5 |
| 7* | 0.7 | 0.00270 | 5.8 | 32 | 1 | 94 |
| 8 | 0.9 | 0.00340 | 6.9 | 37 | 83 | 27 |
| 9 | 1.1 | 0.00420 | 8.2 | 25 | 42 | 58 |
| 10 | 1.3 | 0.00500 | 9.4 | 18 | 32 | 65 |
| 11 | 1.7 | 0.00650 | 11.7 | 15 | 35 | 62 |
| 12 | 1.9 | 0.00725 | 12.8 | 12 | 25 | 71 |
| 13 | 2.5 | 0.00955 | 16.4 | 15 | 1 | 95 |

*These runs were conducted in the absence of carbon dioxide.

EXAMPLE 2

A series of experiments was conducted as follows. For each run, to a reactor were charged 16 g. (0.296 mole) of butadiene, 30 ml. (0.338 mole) of benzene as solvent, 0.5 g. (0.00050 mole) of tris(triphenylphosphine)platinum and additional tertiary phosphine as indicated in Table II below. Where addition of carbon dioxide is noted in Table II, it was charged at room temperature to the pressure indicated. The reaction mixture was maintained at 120° C. for about 17 hours and at the conclusion of this time the pressure was released and the product mixture was analyzed by GLC. The results of this series, i.e., conversion based on butadiene charged with selectivities to products obtained, are shown in Table II.

TABLE II

| Run No. | Triphenylphosphine Added | | Carbon Dioxide, p.s.i. | Total Moles of Phosphine per Mole of Platinum | Conversion, percent | Selectivity to— | |
|---|---|---|---|---|---|---|---|
| | Grams | Moles | | | | 1,3,7-octatriene, percent | 4-vinylcyclohexene, percent |
| 1 | None | | None | 3 | 10 | 24 | 70 |
| 2* | None | | 400 | 2 | 80 | 25 | 60 |
| 3 | None | | 10-30 | 3 | 35 | 72 | 20 |
| 4 | None | | 400 | 3 | 55-100 | 93 | 0-3 |
| 5 | 0.1 | 0.00038 | 400 | 3.8 | 75 | 88 | 12 |
| 6 | 0.3 | 0.00110 | 400 | 5.2 | 60 | 90 | 8 |
| 7 | 0.5 | 0.00190 | 400 | 6.8 | 35 | 86 | 11 |
| 8 | 0.7 | 0.00270 | 400 | 8.4 | 35 | 78 | 18 |
| 9 | 1.0 | 0.00380 | 400 | 10.6 | 35 | 73 | 22 |
| 10 | 2.0 | 0.00765 | 400 | 18.3 | 23 | 15 | 83 |
| 11 | 3.0 | 0.01150 | 400 | 26.0 | 18 | 8 | 90 |

*This run was conducted using 0.5 g. of bis(triphenylphosphine)platinum in place of tris(triphenylphosphine)platinum.

We claim as our invention:

1. The process of producing 1,3,7-octatriene as the major product by dimerizing 1,3-butadiene in the presence of carbon dioxide and of a catalytic amount of a complex of platinum or palladium and a tertiary phosphine of the formula.

$$R_3P$$

wherein R independently is an organo group of from 1 to 10 carbons with only aromatic unsaturation and at least one R is always aromatic, with the proviso that the total moles of tertiary phosphine present in the reaction zone per mole of platinum or palladium is from about 3 to about 8.

2. The process of claim 1 wherein the initial partial pressure of carbon dioxide is at least about 15 p.s.i.

3. The process of claim 1 wherein the catalyst is a platinum catalyst and is introduced in the form of a tris(tert-phosphine)platinum compound and from 0 to 5 moles of additional tertiary phosphine per mole of platinum.

4. The process of claim 1 wherein the catalyst is a platinum catalyst and is introduced in the form of a bis(tert-phosphine)carbonato-platinum compound and from 1 to 6 moles of additional tertiary phosphine per mole of platinum.

5. The process of claim 3 wherein the tris(tert-phosphine)-platinum is tris(triphenylphosphine)platinum and the additional tertiary phosphine is triphenylphosphine.

References Cited

UNITED STATES PATENTS 3,284,520 11/1966 Zuech _____ 260—666
3,267,169 8/1966 Smutny _____ 260—682
3,249,641 5/1966 Storrs et al. _____ 260—666

DELBERT E. GANTY, *Primary Examiner.*

J. D. MYERS, *Assistant Examiner.*

U.S. Cl. X.R.

260—666